United States Patent
Chiu et al.

(10) Patent No.: US 7,234,055 B2
(45) Date of Patent: Jun. 19, 2007

(54) COMPUTER OPERATING BOOTING SYSTEM MAKING USE OF MULTI-BUTTONS

(75) Inventors: Chaucer Chiu, Taipei (TW); Amos Huang, Shanghai (CN)

(73) Assignee: Inventec Corporation, Taipei (TW)

( * ) Notice: Subject to any disclaimer, the term of this patent is extended or adjusted under 35 U.S.C. 154(b) by 421 days.

(21) Appl. No.: 10/923,881

(22) Filed: Aug. 24, 2004

(65) Prior Publication Data

US 2006/0047940 A1    Mar. 2, 2006

(51) Int. Cl.
    *G06F 9/00* (2006.01)
(52) U.S. Cl. .............................. 713/2; 713/1
(58) Field of Classification Search ............. 713/1, 713/2
    See application file for complete search history.

(56) References Cited

U.S. PATENT DOCUMENTS

| | | | |
|---|---|---|---|
| 5,448,741 A * | 9/1995 | Oka ............................... 713/2 |
| 6,032,255 A * | 2/2000 | Shim et al. ..................... 713/2 |
| 6,061,788 A * | 5/2000 | Reynaud et al. ............... 713/2 |
| 6,212,439 B1 * | 4/2001 | Cha .............................. 700/83 |
| 6,430,663 B1 * | 8/2002 | Ding .......................... 711/162 |
| 6,550,006 B1 * | 4/2003 | Khanna ......................... 713/2 |
| 6,631,469 B1 * | 10/2003 | Silvester ....................... 713/2 |
| 6,727,920 B1 * | 4/2004 | Vineyard et al. ........... 715/810 |
| 6,839,836 B2 * | 1/2005 | Cole et al. ..................... 713/2 |
| 6,928,542 B2 * | 8/2005 | Wen et al. ..................... 713/2 |
| 6,957,286 B1 * | 10/2005 | Cohen .......................... 710/38 |
| 2003/0023844 A1 * | 1/2003 | Combe et al. ................. 713/2 |
| 2003/0088764 A1 * | 5/2003 | Wen et al. ..................... 713/2 |
| 2005/0015581 A1 * | 1/2005 | Chen ............................ 713/2 |

* cited by examiner

*Primary Examiner*—Chun Cao
(74) *Attorney, Agent, or Firm*—Rabin & Berdo, P.C.

(57) ABSTRACT

A multi-buttons booting system comprises an on-switch button logic unit, an embedded chip (EC) and its RAM, a lookup module, and a loading module. A plurality of on-switch buttons are connected to the EC and corresponds to a plurality of operating systems. In response to the push on a button, the EC outputs a signal that writes an indicator value in the RAM. According to the indicator value, the corresponding MBR is sought and loaded. The loaded MBR then conducts the booting of a corresponding operating system. The system resource occupation is thereby reduced, the activation speed is increased, and the user's manual intervention is reduced.

16 Claims, 5 Drawing Sheets

FIG.1

PRIOR ART

COMPUTER OPERATING BOOTING SYSTEM MAKING USE OF MULTI-BUTTONS

BACKGROUND OF THE INVENTION

1. Field of Invention

The present invention generally relates to computer booting systems and methods thereof. More particularly, the invention provides a multi-buttons booting system and method thereof implemented to boot on different computer operating systems.

2. Related Art

The activation of a computer and the load of an operating system usually are included in a so-called "bootstrap process", or more simply designated a "booting" process. The activating process usually differs according to the specific operating system used.

Figure 1:
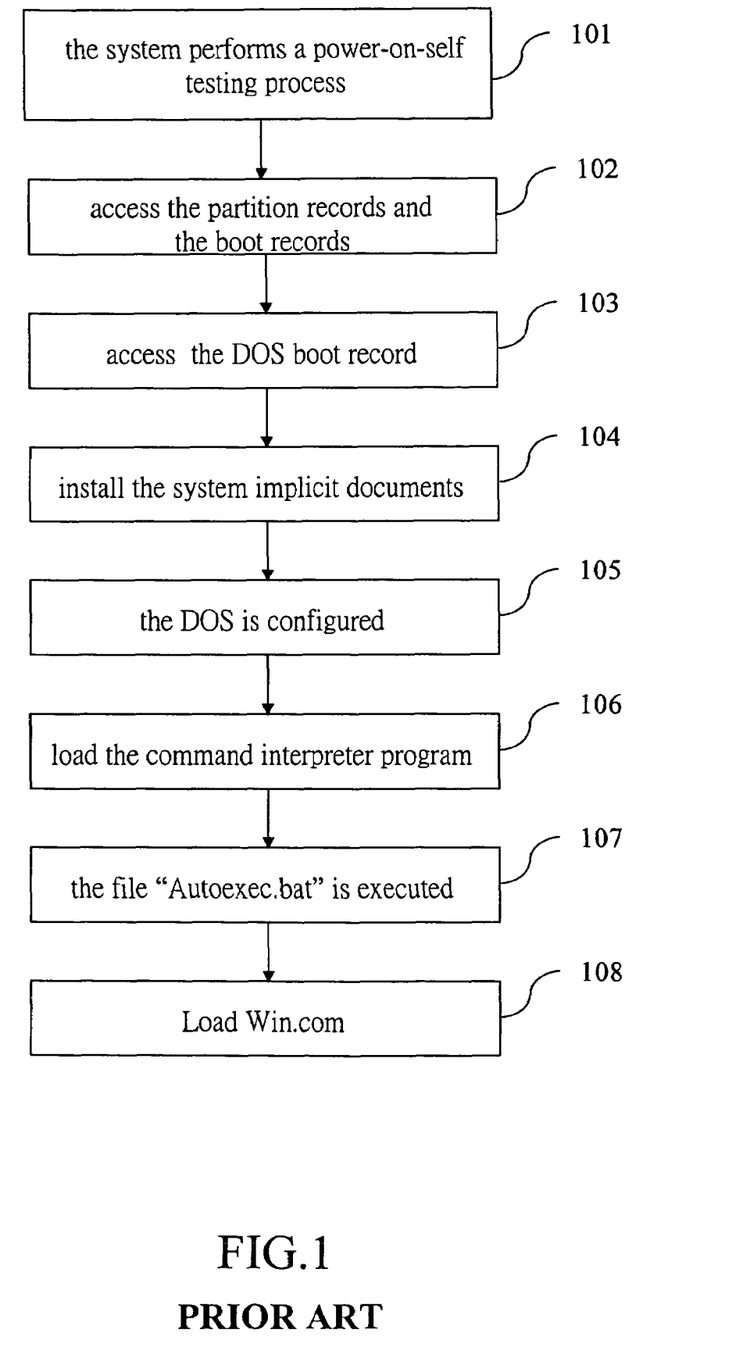
FIG. 1 is a flowchart of the conventional booting process of the operating system Win9x/DOS.

FIG. 1 is a flowchart of the conventional activating process of the operating system Win9x/DOS. In a first stage, the system performs a power-on-self testing (POST) process (step 101). The microprocessor executes the program stored at the address FFFF0H where is fixed a ROM program. This program performs a checkup of the system hardware including its memory.

In a second stage, the partition records and the boot records are accessed (step 102). Once the microprocessor has found that the hardware is normal and is compatible to the CMOS settings, the activation is performed from the device, for example the hard drive, corresponding to the CMOS settings. The microprocessor then typically accesses to the disk partition record (DPT) and the main boot record.

In a third stage, the microprocessor accesses to the DOS boot record (step 103). If the main boot record and the partition table are tested correctly, the microprocessor executes the main boot record and further accesses to the DOS main boot record, being located in the first sector of each main partition. Subsequently, the microprocessor executes the DOS boot record.

In a fourth stage, the microprocessor installs the system implicit documents (step 104). The implicit document "IO.SYS" of the DOS system is loaded in the memory as well as the basic document system FAT. At this moment, the monitor usually displays the words "Starting Windows 9x . . . ". "IO.SYS" loads "MS.SYS" in the memory, processes the documents "System.dat" and "User.dat", and loads the disk compression program.

In a fifth stage, the DOS is configured (step 105). Once the system implicit documents have been loaded, the microprocessor executes the system implicit documents and the system configuration document "Config.sys", and loads the driving programs defined in "Config.sys".

In a sixth stage, the microprocessor loads the command interpreter program ("Command.com") (step 106). The system installs the command management program to manage all the system operation commands (the commands "Dir", "Copy", etc. are usually provided by Command.com).

In a seventh stage, the file "Autoexec.bat" is executed (step 107). The computer executes one-by-one the commands defined in the file "Autoexec.bat".

In an eighth stage, "Win.com" is loaded (step 108). Win.com is in charge of executing the driving programs and execution files of Windows. The booting process is thereby completed.

After the PSOT process, the hard drive is reset and the BIOS will proceeds to the booting process according to the sequence specified by the user, i.e. from the floppy device, the hard drive or the optical disk drive. For example, if the booting process is to be conducted from the hard drive, the system BIOS loads the main boot record into the memory. Subsequently, the control right is switched to the main boot record (MBR) and the disk partition table DPT is checked to find an active partition. Lastly, the main boot record hands the control right to the boot program of the active partition, which loads the operating system.

The main boot sector starts at the location (cylinder 0, side0, sector 1) of the hard disk, and includes the main boot record (MBR) and the disk partition table (DPT) of the hard disk. The main boot sector has a size of 512 bytes, wherein the MBR occupies 446 bytes (0000 h-01BDh), the DPT 64 bytes (01BE-01FD), and the end indicator 2 bytes (55AA). The main boot record is used to verify whether the DPT is correct and which partition is the booting partition, and when the program ends the main boot record loads the booting program (for example IO.SYS of the operating system DOS) of the partition into the memory and turns the control right to it. The partition table has 80H or 00H as start indicator, and 55AAH as end indicator, totally 64 bytes are located in the end portion of the sector.

The structure of the main boot sector is as follows:

000H-08AH: MBR booting program (searching for the booting partition);
08BH-0D9H: the MBR booting string;
0DAH-1BCH: spare area ("0");
1BEH-1FDH: disk partition table; and
1FEH-1FFH: end indicator ("55AA").

The DPT occupies 64 bytes (01BE-01FD), each partition occupies 16 bytes, so four partitions can be represented. This is the reason that each hard disk totally can include only four partitions, including main and extension partitions. The structure of each partition is defined as follows:

| Offset | Length (bytes) | Description |
|--------|----------------|-------------|
| 0H | 1 | Partition type: 00 means inactive partition; 80 means active partition; other means invalid partition. |
| 1h | 3 | Partition start address (side/sector/cylinder); conventionally, the start address is (side 1, sector 0, cylinder 1) and the corresponding combines to form the address 010100. |
| 4h | 1 | Operating system type of the partition |
| 5h | 3 | Partition end address |
| 8h | 4 | Partition start logic sector |
| Ch | 4 | Partition occupation in number of sectors |

The operating system boot record (OBR) is conventionally located at (cylinder 0, side 1, sector 1), which is the case for DOS. For operating systems activated via multi-booting modes, the OBR is located at the first sector of the corresponding main/extended partition. The OBR is the first sector the operating system can address to, and also includes a booting program and a BIOS parameter block (BPB). Each logic partition has an OBR, and its parameter differs depending upon the partition size and the type of operating system. The booting program is executable to determine whether the two documents of the partition root directory are booting documents of the operating system (for example, the documents "IO.SYS" and "MSDOS.SYS" of MSDOS or Win9x/Me). If this is the case, the first document is loaded into the memory, and the control right is turned to the document in question. The BPB parameters record the start sector, the end sector, the document storage format, the hard disk medium describing symbol, the root directory size, FAT number, the allocution unit size, etc. The OBR is generated via a high formatting program (for example, "Format.com" for the DOS operating system).

Recently, computer appliances have become more multi-functional incorporating many application programs. Notwithstanding the improved performance, some disadvantageous aspects of the computer may still remain. This is the case of the operating system booting that starts at every on-switch of the computer, which is time-consuming, and occupies substantial system resources. If some insecure services are activated, the system may become vulnerable to attacks. Moreover, specific software programs have to be installed according to different functionality, otherwise a normal working process cannot be conducted. The manipulation of the whole operating system usually requires a certain expertise and is not user-friendly.

For example, if the user only wants to watch a movie or listen to music on a computer, he has to wait until the installation of the whole operating system has been completed. This usually takes a long time and loads a lot of functionality that is not needed for the user's utilization.

To overcome the foregoing disadvantages, an approach known in the art consists of using a boot installation program that can boot a plurality of operating systems. When the on-switch button is pushed on, to power on the computer, the boot installation program is executed. During its execution, a selection interface, showing a plurality of operating systems, is displayed to allow the user to choose a specific operating system that are provided with adequate function characteristics, more adapted to the user's demands.

However, the user conventionally has to wait a certain time before the selection interface is displayed, and the wanted operating system cannot be directly run. A disadvantage of this technique is that it needs a manual intervention in the booting process, which decreases the system activation performance, renders it more difficult to use, and increases failure.

SUMMARY OF THE INVENTION

It is therefore an objective of the invention to provide a computer multi-buttons booting system and method that can overcome the prior problems. In the system according to the invention, the push of one specific on-switch button activates one specific operating system so that the system resource occupation can be reduced, the activation speed is increased, and the user's intervention in the system activation is reduced.

To achieve the above and other objectives, a multi-buttons booting system comprises an on-switch button logic unit, providing a plurality of on-switch buttons and operable to generate an electrical signal corresponding to the pushing of one on-switch button; an embedded chip and its RAM, being coupled to the on-switch button logic unit, wherein the embedded chip generates an interruption process in response to the electrical signal from the on-switch button logic unit and writes different indicator data in the RAM corresponding to the pushed on-switch buttons; a look-up module, searching a main boot record corresponding to the indicator data value in the RAM of the embedded chip; and a loading module, loading a main boot record according to the lookup status.

According to another embodiment, a multi-buttons booting method comprises providing a plurality of on-switch buttons respectively connected to one embedded chip; according to a number of operating systems provided setting a plurality of corresponding main boot records; detecting a signal change of the embedded chip caused by one on-switch button pushing; writing an indicator value in a RAM of the embedded chip corresponding to the signal change; searching a main boot record corresponding to the indicator value; loading a main boot record according to the result of the searching a main boot record corresponding to the indicator value, and according to the loaded main boot record booting the corresponding operating system.

According to specific functions, the system according to the invention therefore provides specific activation buttons. According to the specific functionality required, the user therefore can directly set the adequate operating system by pushing on the corresponding on-switch button. The booting speed therefore is faster, and the system resource occupation is reduced. Moreover, given the fact, that the service spectrum and the security strategy are initially set in the operating system, the users manual settings are reduced while the security is improved and attacks are reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus does not limit the present invention, wherein.

DETAILED DESCRIPTION OF THE INVENTION

Once the computer is switched on, control is handed to the computer CPU. The CPU then executes commands stored in the BIOS of the motherboard. A final portion of the BIOS commands includes a booting program. This booting program accesses to the MBR of the first sector of the first hard disk. The MBR includes a main booting program and a disk partition table indicating the partition status of the disk. The BIOS executes the main booting program to terminate the booting process. The main booting program accesses the disk partition table to obtain the active partition(s). If there is only one main partition, the operating system installed therein is activated.

If one hard disk contains a plurality of main partitions, each partition may include one operating system. In this case, the first sector of each partition includes its boot record. Each of these boot records includes a booting program that executes the operating system stored in the corresponding partition. After the active partition has been found, the main boot record executes the booting program of the active partition. The booting program installs documents of the operating system and then runs the operating system.

Most of the conventionally known operating systems, such as DOS, Windows 3.x, Windows 95/98, or Windows NT have to be booted from one active partition. However, different operating systems use different booting methods from the active partition. For example, the operating systems DOS, Windows 3.x or Windows 95/98 must run from the active partition of the first hard disk; Windows NT can run from a logic partition, but its booting program must be put in an active partition of the first hard drive; OS/2 can run from a logic partition, but the extended partition including the logic partition must be within the first 2 GB of the hard drive; and Linux can run from a logic partition as well as a main partition.

It should be noted that the MBR is created via a partitioning program (for example, the program Fdisk.exe of the operating system DOS). The MBR sector may differ with different operating systems, and the user can also freely modify the MBR as long as it is capable of achieving the aforementioned tasks. In current techniques, the MBR is usually modified to support multi-booting processes. Therefore, the user usually has to wait until the processing sequence reaches the load of the MBR to be able to select the desired operating system to run.

The invention provides a multi-button booting method that uses a plurality of computer on-switch buttons that allow booting on different operating systems.

Figure 2:
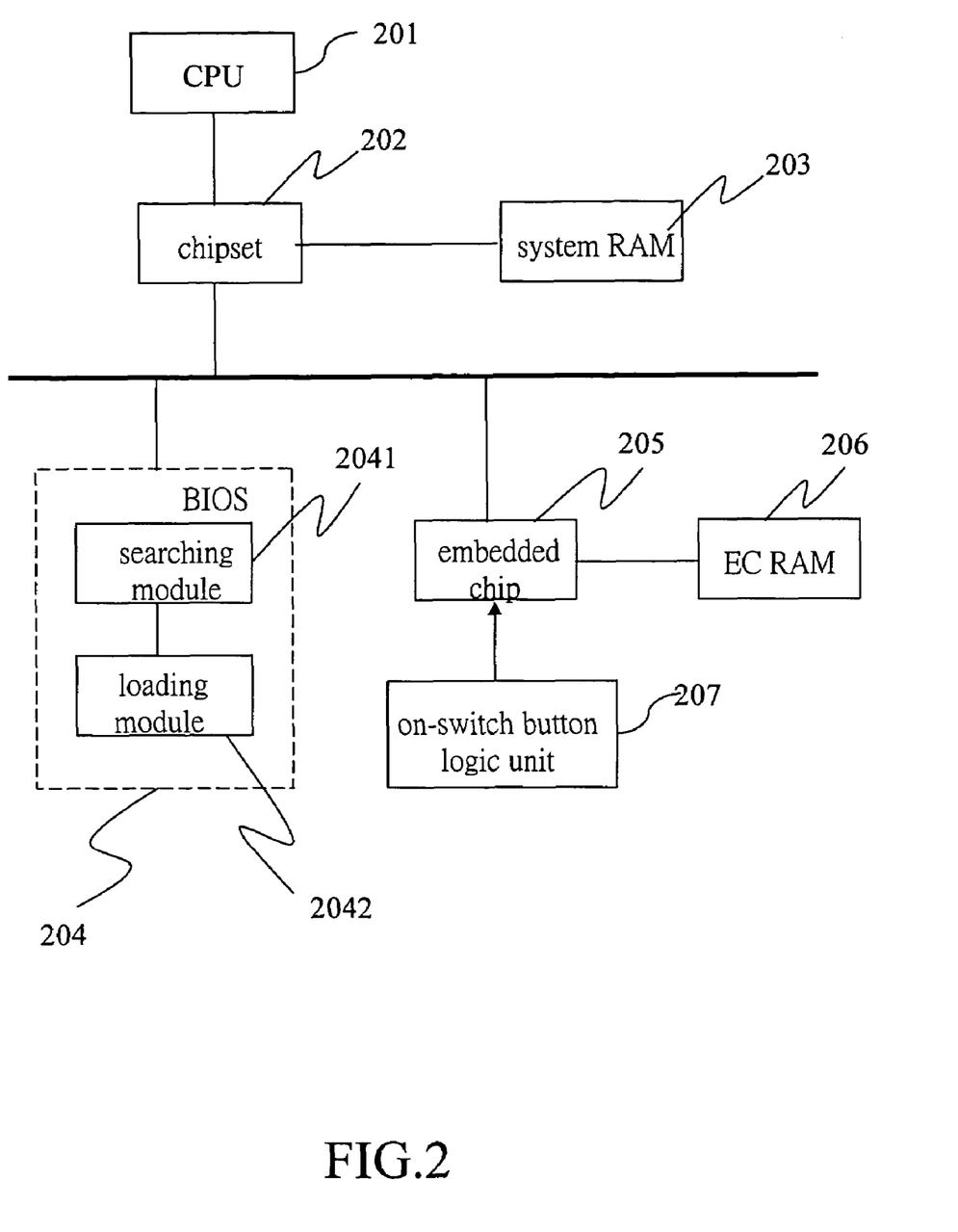
FIG. 2 is a block diagram of a computer multi-buttons booting system for activating a different operating system according to an embodiment of the invention.

FIG. 2 is a block diagram of a multi-button on-switch system, suitable for booting the computer on different operating systems according to an embodiment of the invention. The system includes a CPU 201, a chipset 202, a system RAM 203, a BIOS 204, a searching module 2041, a loading module 2042, an embedded chip (EC) 205, an EC chip RAM 206, and an on-switch button logic unit 207.

The on-switch button logic unit 207 is used to provide a plurality of on-switch buttons and outputs electric signals specific to the pushing of each on-switch button. The EC 205 and its RAM 206 are respectively connected to the logic unit 207. The EC 205 responds to the electric signals outputted by the on-switch button logic unit 207 by generating corresponding interruption processes, and writes an indicator value into the EC RAM 206 specific to each pushed on-switch button. The searching module 2041 is operable to search the MBR, to be set corresponding to the indicator value stored in the EC RAM. According to the search status, the loading module 2042 loads the corresponding MBR.

The on-switch button logic unit 207 includes a plurality of on-switch buttons, each on-switch button corresponds to the activation of one operating system.

Figure 3:
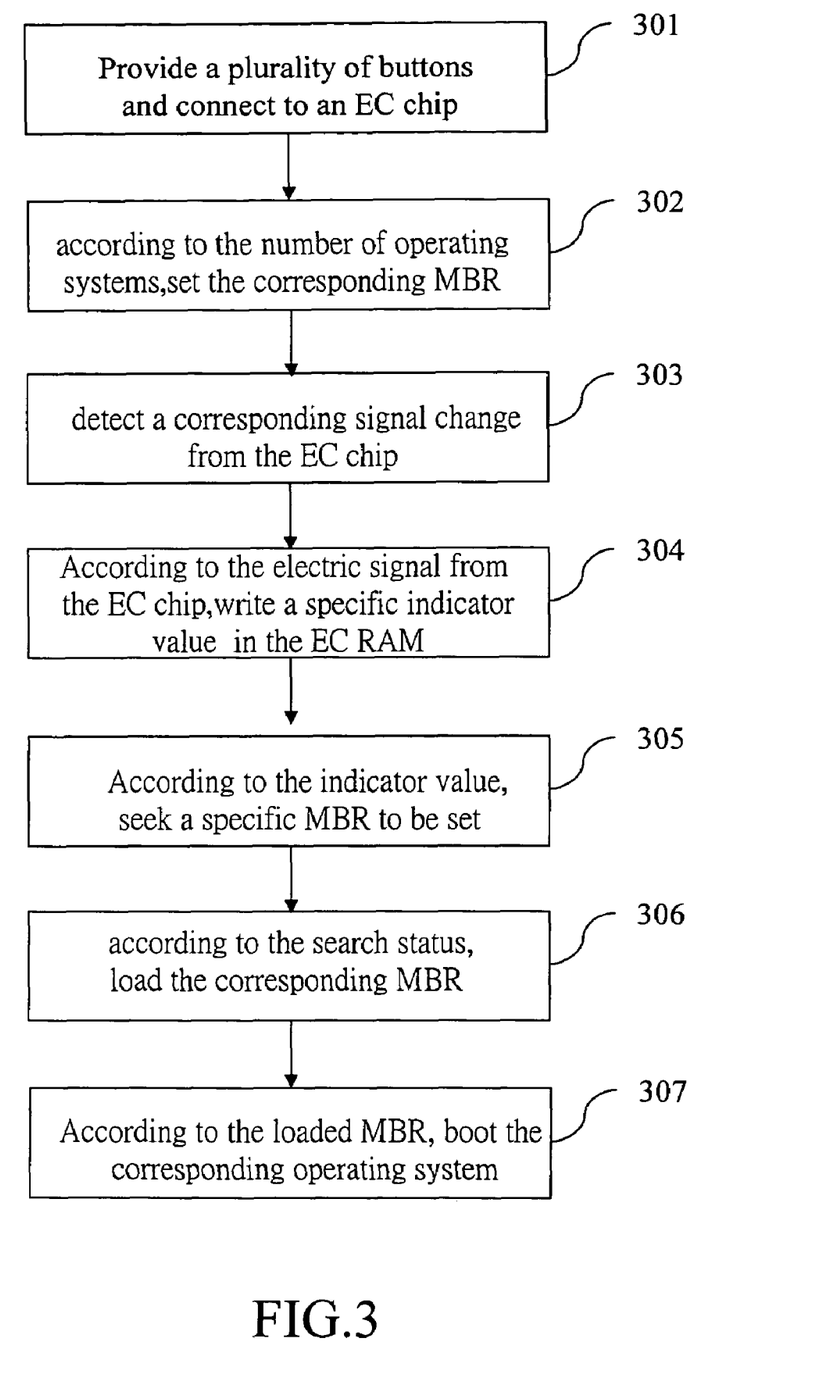
FIG. 3 is a flowchart of a computer multi-buttons booting method according to an embodiment of the invention.

FIG. 3 is a flowchart of a method of activating one system, belonging to a plurality of operating systems, via a plurality of buttons. A plurality of buttons is provided and is respectively connected to an EC chip (step 301). According to the number of operating systems, the corresponding MBR are specifically set (step 302). When one on-switch button is pushed, a corresponding signal change from the EC chip is detected (step 303). According to the electric signal from the EC chip, a specific indicator value is written in the EC RAM (step 304). According to the indicator value, a specific MBR to be set is sought (step 305). According to the search status, the corresponding MBR is loaded (step 306). According to the loaded MBR, the corresponding operating system is booted (step 307).

A specific feature of the invention lies in the booting process, in which different hardware signals are differentiated to boot the corresponding operating system. Once the computer is switched on, the firmware code of the EC in the 8051 core executes an initialization without activating the system. The on-switch buttons thereby can be distinguished from one another. The EC includes a plurality of general-purposes inputs/outputs that can be set by the user. The effective general-purposes inputs (GPI) operate to interrupt the EC. The interruption service program is described hereafter.

Figure 4:
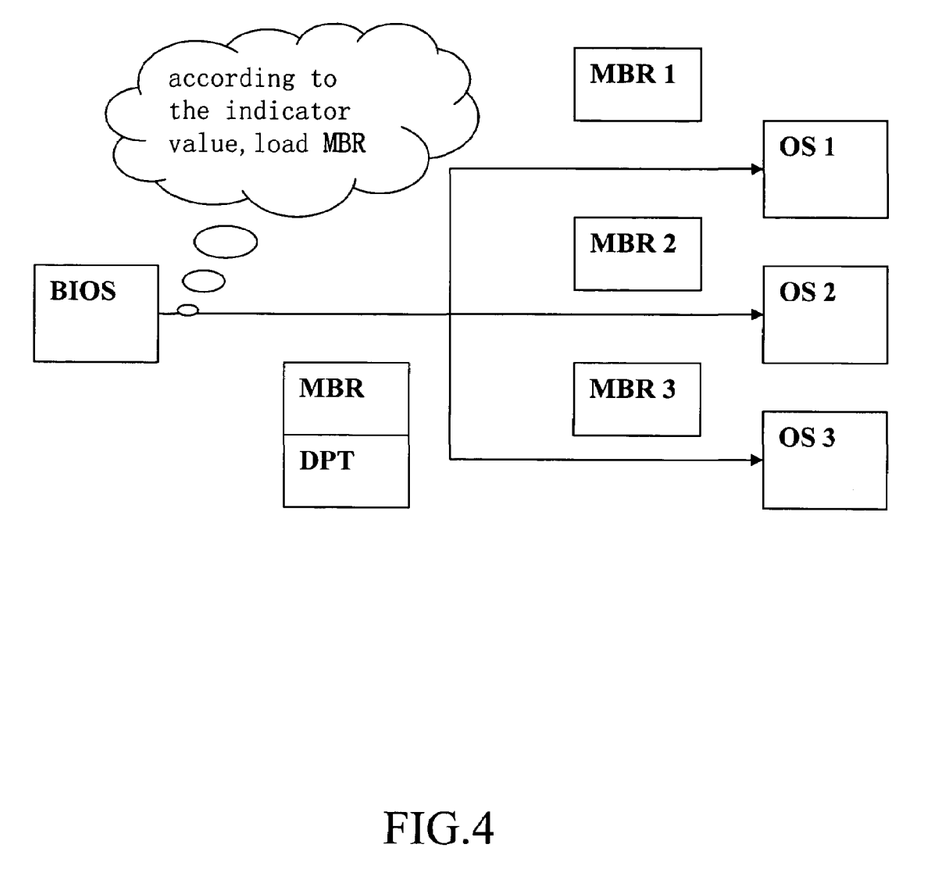
FIG. 4 is a schematic view of a MBR loading process according to an embodiment of the invention.

Current BIOS uses the interruption 19H to directly load the MBR of the main boot sector into the memory at the address 0:7C00H. The use of one MBR in the invention is not sufficient, because each operating system has to correspond to one independent MBR. FIG. 4 is a diagram of the MBR loading process according to an embodiment of the invention. When the BIOS is loading an MBR, an additional determination step is performed, whereby the main boot record to be set is loaded according to the indicator value written by the EC firmware in the RAM. Each operating system with its main boot record is respectively distinguished via the digit 1, 2, 3. For example, if the indicator value represents the value 2, the BIOS then loads the MBR2 and determines whether it exists. If the MBR2 to be set exists the DPT is loaded thereafter to boot the OS2; otherwise a MBR and DPT are loaded for protection purposes and the selection of the OS to boot is given to the user according to a default mode. A method of determining whether the main boot record to be set existed, can include first writing a single indicator string at a location of each main boot record, and then looking up the indicator string. For example, setting the main boot record specific to the operating system of a game station can include adding the string "game" therein; this known string then is looked up to determine whether the MBR exists.

In the embodiment of the invention, the on-switch button signals are coupled to the corresponding EC GPI, so that the EC can receive on-switch signals.

In the interruption service program of the EC firmware, indicator values are written in the EC RAM specific to the different on-switch buttons. The indicator values can be predefined by the programmer, each indicator value corresponds to one on-switch button.

In the BIOS program, after the POST has been completed, a main boot record is loaded according to the indicator value stored in the EC RAM, which corresponds to the pushed on-switch button. The main boot record loaded from a non-MBR area is evaluated. If the main boot record effectively exists, the disk partition table data of the MBR is added after the main boot record, to boot the corresponding operating system; otherwise an MBR and DPT are loaded to conduct a user selection of an operating system, which constitutes a protection measure against OS failure.

In addition, the MBR has to be set at a specific location of the hard disk, for example, an OS undefined portion of the first cylinder. The size of one main boot record specific to one operating system is 446 bytes, the partition table data are commonly shared and do not need to be rewritten.

The core and modules of the operating system and the upper-level application programs also need corresponding adjustment so as to only load necessary elements and achieve a fast activation process.

Figure 5:
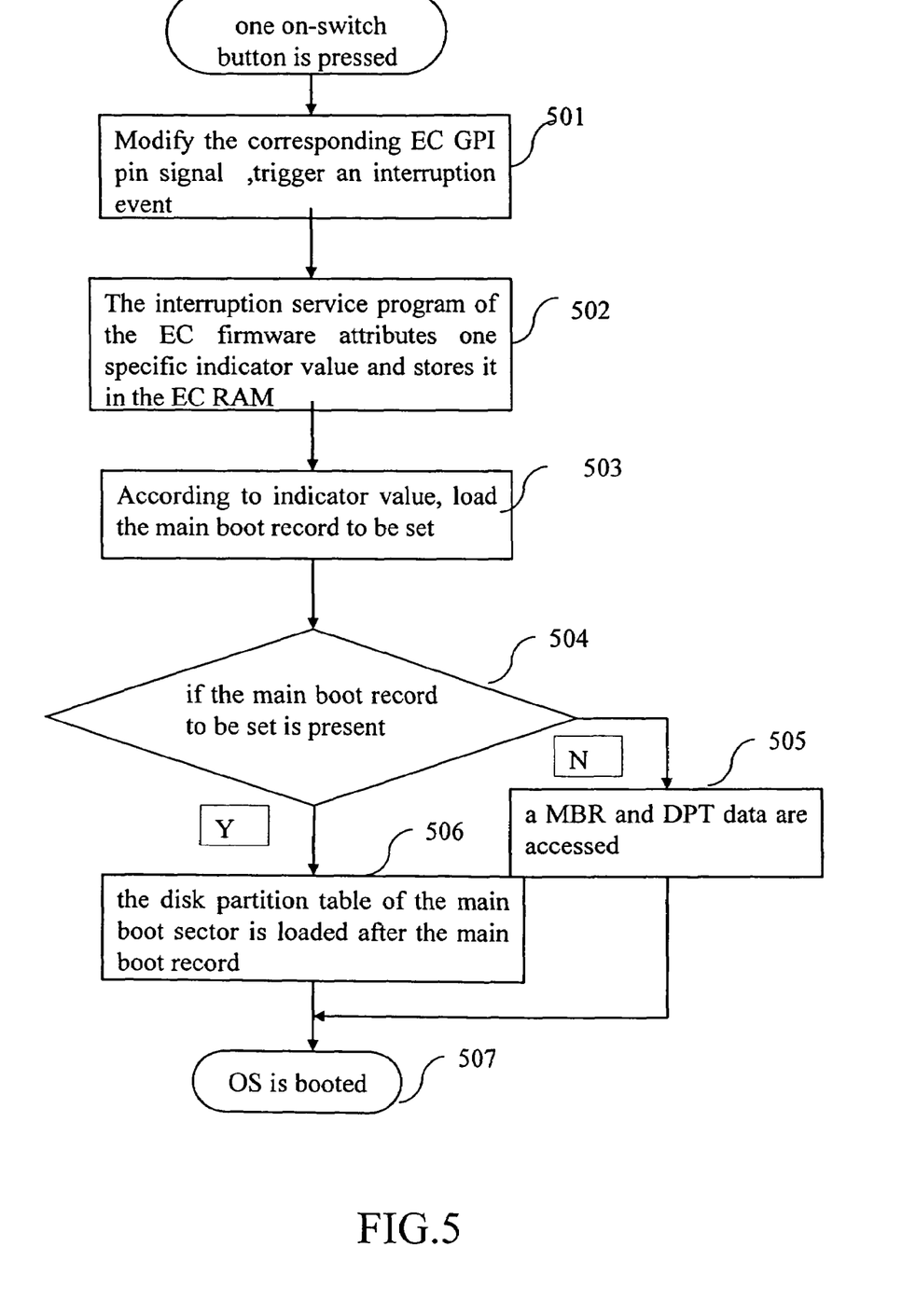
FIG. 5 is a flowchart of the operation of an embodiment of the invention.

FIG. 5 is flowchart describing the operation of the system according to an embodiment of the invention. When one on-switch button is pressed, the corresponding EC GPI pin signal is modified, which triggers an interruption event (step 501). The interruption service program of the EC firmware attributes one specific indicator value and stores it in the EC RAM, each on-switch button corresponding to one indicator value (step 502). After the POST process has been completed, the BIOS accesses to the to-be-set main boot record of a non-MBR area in accordance with the indicator value in the EC RAM, wherein the non-MBR area is at a specific location of the hard disk, for example, an OS undefined portion of the first cylinder (step 503). It is then determined whether the main boot record to be set is present (step 504). If the main boot record to be set is not present a MBR and DPT data are accessed (step 505); otherwise the disk partition table of the main boot sector is loaded after the main boot record (step 506). According to the main boot record and the disk partition table, the corresponding operating system then is booted (step 507).

It will be apparent to the person skilled in the art that the invention as described above may be varied in many ways, and notwithstanding remaining within the spirit and scope of the invention as defined in the following claims.

What is claimed is:

1. A computer operating booting system using multiple buttons operable to selectively load different main boot records and thereby boot on different computer operating systems by pushing on different on-switch buttons, the system comprising:
   an on-switch button logic unit, providing a plurality of on-switch buttons and operable to generate an electrical signal corresponding to the pushing of one on-switch button, and allowing booting on different operating systems;
   an embedded chip and its RAM, being coupled to the on-switch button logic unit, wherein the embedded chip generates an interruption process in response to the electrical signal from the on-switch button logic unit and writes an indicator data value in the RAM corresponding to the pushing of the one on-switch button;
   a search module, configured to search for a main boot record, to be set corresponding to the indicator data value in the RAM of the embedded chip, and a searched result of the main boot record to be loaded for accessing the main boot record; and
   a loading module, loading the main boot record according to a status of the search module, wherein when the computer operating system is loading the main boot record, each of the operating systems with its main boot record is respectively distinguished via the indicator data value, the computer operating system then loads the main boot record corresponding to the indicator data value and determines whether the main boot record exists, if the main boot record to be set exists the disk partition table is loaded thereafter to boot the corresponding operating system; and
   wherein each computer operating system corresponds to one independent main boot record.

2. The system of claim 1, wherein the on-switch button logic unit comprises a plurality of on-switch buttons, each on-switch button corresponding to the activation of one operating system.

3. The system of claim 1, wherein each indicator data value corresponds to one on-switch button.

4. The system of claim 1, wherein each main boot record corresponding to each indicator data value includes one indicator string.

5. The system of claim 1, wherein the different computer operating systems are booted by different hardware signals differentiated, when a computer with the different computer operating systems is switched on, a firmware code of the embedded chip in a 8051 core executes an initialization without activating the computer operating systems, the on-switch buttons thereby can be distinguished from one another.

6. The system of claim 1, wherein the embedded chip includes a plurality of general-purposes inputs and outputs that can be set by the user, effective general-purposes inputs (GPI) of the general-purposes inputs operate to interrupt the embedded chip, an interruption service program is described afterwards.

7. The system of claim 1, wherein the computer operating system loads the main boot record corresponding to the indicator data value and determines whether the main boot record exists, if the main boot record to be set does not exist, a protective main boot record and a protective disk partition table are loaded for protection purposes and a selection of operating systems to boot is given to a user according to a default mode.

8. A computer operating booting method using multiple buttons, wherein different operating systems are respectively booted by pushing on different on-switch buttons, the method comprising:
   providing a plurality of on-switch buttons respectively connected to one embedded chip, wherein the on-switch buttons allow booting on different operating systems;
   according to a number of operating systems provided setting a plurality of corresponding main boot records;
   detecting a signal change of the embedded chip caused by one on-switch button pushing;
   writing an indicator value in a RAM of the embedded chip corresponding to the signal change;
   searching a main boot record corresponding to the indicator value to be set corresponding to the indicator value stored in the RAM, and a searched result of the main boot record to be loaded for accessing the main boot record;
   loading the main boot record according to the result of the step of searching the main boot record corresponding to the indicator value, wherein when the computer operating system is loading the main boot record, each of the operating systems with its main boot record is respectively distinguished via the indicator data value, the computer operating system then loads the main boot record corresponding to the indicator data value and determines whether the main boot record exists, if the main boot record to be set exists the disk partition table is loaded thereafter to boot the corresponding operating system; and
   according to the loaded main boot record booting the corresponding operating system,
   wherein each computer operating system corresponds to one independent main boot record.

9. The method of claim 8, wherein each on-switch button corresponds to the activation of one operating system.

10. The method of claim 8, wherein the main boot records are initially placed at a specific location of a hard disk.

11. The method of claim 8, wherein searching a main boot record corresponding to the indicator value comprises looking up the indicator value in each main boot record and thereby determining whether the sought main boot record exists.

12. The method of claim 8, wherein loading a main boot record according to the result of the searching a main boot record corresponding to the indicator value further comprises:

if the main boot record is found, loading a disk partition table after the main boot record to boot the corresponding operating system.

13. The method of claim 8, wherein loading a main boot record according to the result of the searching a main boot record corresponding to the indicator value further comprises:

if the main boot record corresponding to the indicator is not found, loading main boot sector data.

14. The method of claim 8, wherein the different computer operating systems are booted by different hardware signals differentiated, when a computer with the different computer operating systems is switched on, a firmware code of the embedded chip in a 8051 core executes an initialization without activating the computer operating systems, the on-switch buttons thereby can be distinguished from one another.

15. The method of claim 8, wherein the embedded chip includes a plurality of general-purposes inputs and outputs that can be set by the user, effective general-purposes inputs (GPI) of the general-purposes inputs operate to interrupt the embedded chip, an interruption service program is described afterwards.

16. The method of claim 8, wherein, in the step of loading the main boot record, the computer operating system loads the main boot record corresponding to the indicator data value and determines whether the main boot record exists, if the main boot record to be set does not exist, a protective main boot record and a protective disk partition table are loaded for protection purposes and a selection of operating systems to boot is given to a user according to a default mode.

* * * * *